(12) United States Patent
Bendall et al.

(10) Patent No.: US 10,018,467 B2
(45) Date of Patent: Jul. 10, 2018

(54) SYSTEM AND METHOD FOR MEASURING A DISTANCE TO AN OBJECT

(76) Inventors: Clark Alexander Bendall, Syracuse, NY (US); Daniel H J McClung, Jamesville, NY (US)

( * ) Notice: Subject to any disclaimer, the term of this patent is extended or adjusted under 35 U.S.C. 154(b) by 860 days.

(21) Appl. No.: 13/156,598

(22) Filed: Jun. 9, 2011

(65) Prior Publication Data

US 2012/0314058 A1 Dec. 13, 2012

(51) Int. Cl.
| | |
|---|---|
| *H04N 7/18* | (2006.01) |
| *G01C 3/08* | (2006.01) |
| *G01C 11/00* | (2006.01) |
| *G06T 7/50* | (2017.01) |
| *H04N 5/232* | (2006.01) |

(52) U.S. Cl.
CPC ............... *G01C 3/08* (2013.01); *G01C 11/00* (2013.01); *G06T 7/50* (2017.01); *H04N 5/23293* (2013.01)

(58) Field of Classification Search
CPC .. G01C 3/08; G01C 11/00; G06T 7/50; H04N 5/23293
USPC ........................................................ 348/135
See application file for complete search history.

(56) References Cited

U.S. PATENT DOCUMENTS

| | | | | |
|---|---|---|---|---|
| 6,009,189 | A * | 12/1999 | Schaack ........................ | 382/154 |
| 6,243,537 | B1 | 6/2001 | Higashino | |
| 6,775,404 | B1 * | 8/2004 | Pagoulatos ............... | G06T 3/00 |
| | | | | 128/916 |
| 7,170,677 | B1 * | 1/2007 | Bendall et al. ............... | 359/464 |
| 7,564,626 | B2 | 7/2009 | Bendall et al. | |
| 7,782,453 | B2 | 8/2010 | Bendall et al. | |
| 7,812,968 | B2 | 10/2010 | Bendall et al. | |
| 7,821,649 | B2 | 10/2010 | Bendall et al. | |
| 2004/0042774 | A1 * | 3/2004 | Takeuchi ........................ | 396/61 |
| 2005/0030387 | A1 * | 2/2005 | Pilu .......................... | 348/211.99 |

(Continued)

FOREIGN PATENT DOCUMENTS

| | | |
|---|---|---|
| CN | 1867941 A | 11/2006 |
| DE | 19949838 A1 | 4/2000 |

OTHER PUBLICATIONS

Office Action in Chinese Patent Application No. 20120185993.5 mailed Jun. 26, 2015.

(Continued)

*Primary Examiner* — Christopher S Kelley
*Assistant Examiner* — Matthew Kwan
(74) *Attorney, Agent, or Firm* — Mintz Levin Cohn Ferris Glovsky and Popeo, P.C.

(57) ABSTRACT

A system for measuring a distance to an object includes a camera positioned at a location and a signal generated by the camera that is reflective of a camera setting. A controller operably connected to the camera receives the signal and generates an accuracy signal based on the signal. The accuracy signal is reflective of a predicted accuracy of a distance measurement. An indicator operably connected to the controller provides an indication reflective of the accuracy signal. A method for measuring a distance to an object includes positioning a camera and generating a signal reflective of a predicted accuracy of a distance measurement. The method further includes providing an indication reflective of the signal, capturing one or more images of the object at the location, and calculating a distance to the object based on the one or more captured images of the object at the location.

18 Claims, 4 Drawing Sheets

(56) References Cited

U.S. PATENT DOCUMENTS

2006/0197937 A1\* 9/2006 Bamji et al. ................. 356/5.01
2007/0065042 A1\* 3/2007 Vroomen ...................... 382/286
2008/0204566 A1\* 8/2008 Yamazaki et al. ....... 348/208.99

OTHER PUBLICATIONS

European Search Report for Application No. EP12171028 dated Jun. 29, 2016.

\* cited by examiner

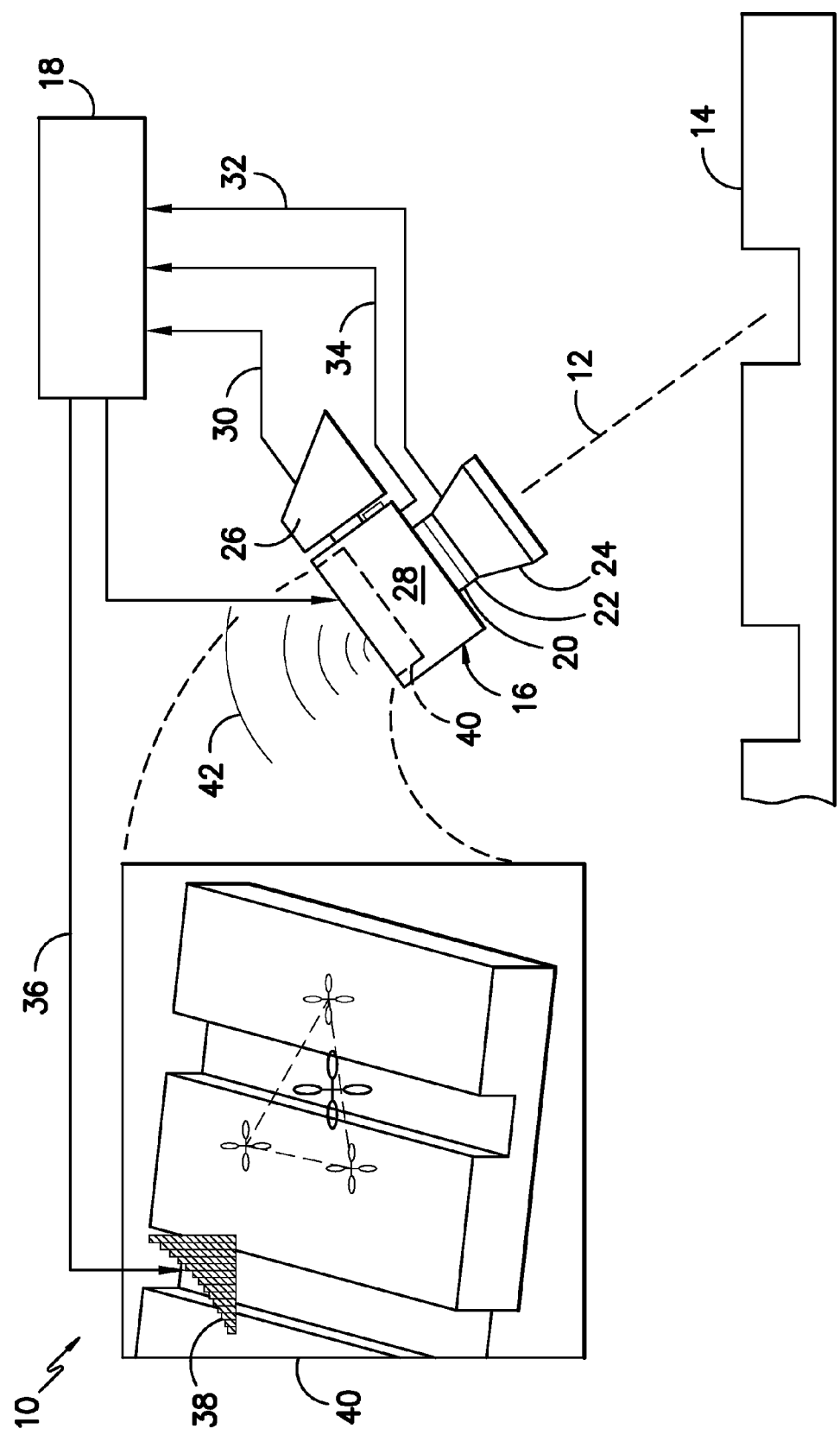
FIG. -1-

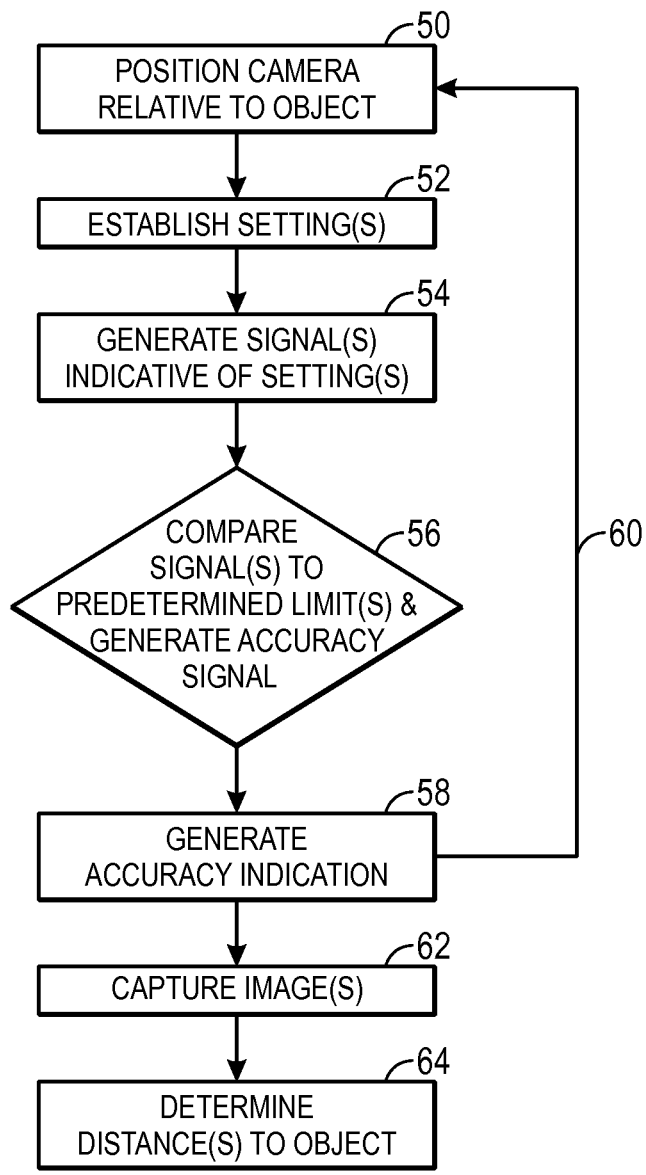
FIG. -2-

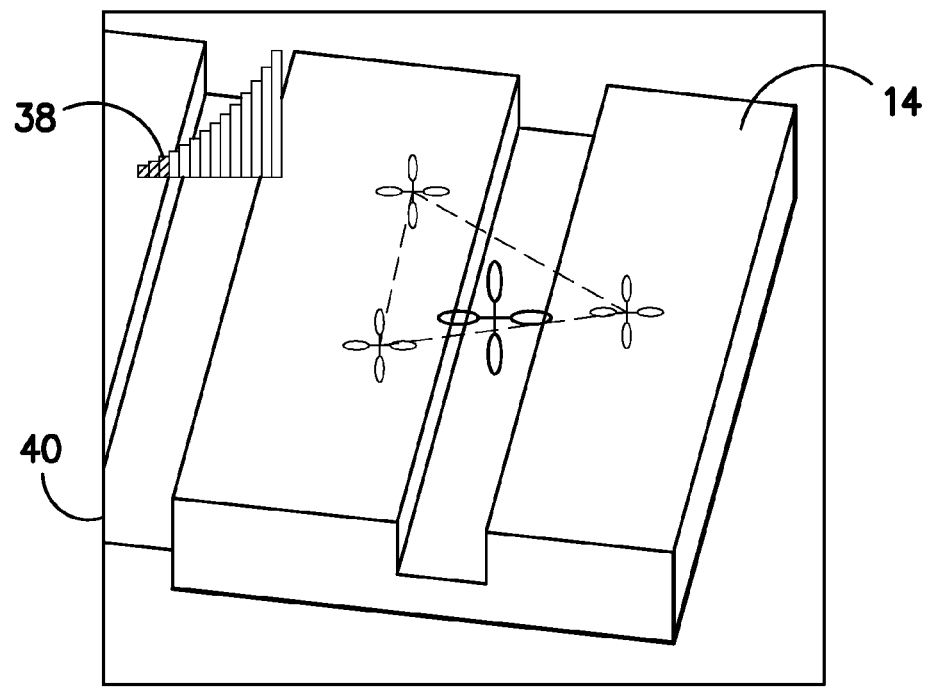
FIG. -3-
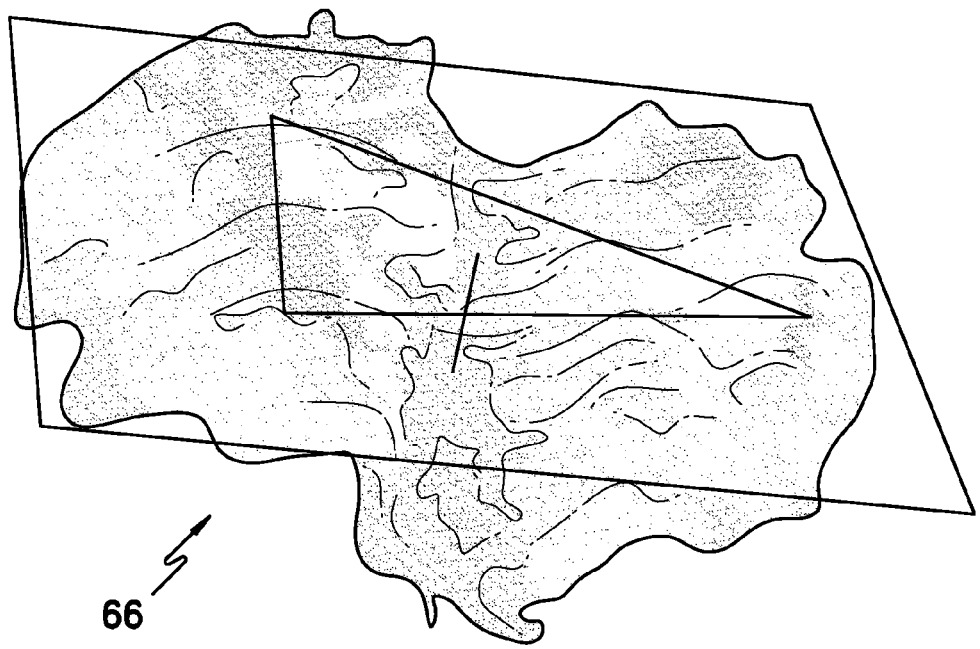
FIG. -4-

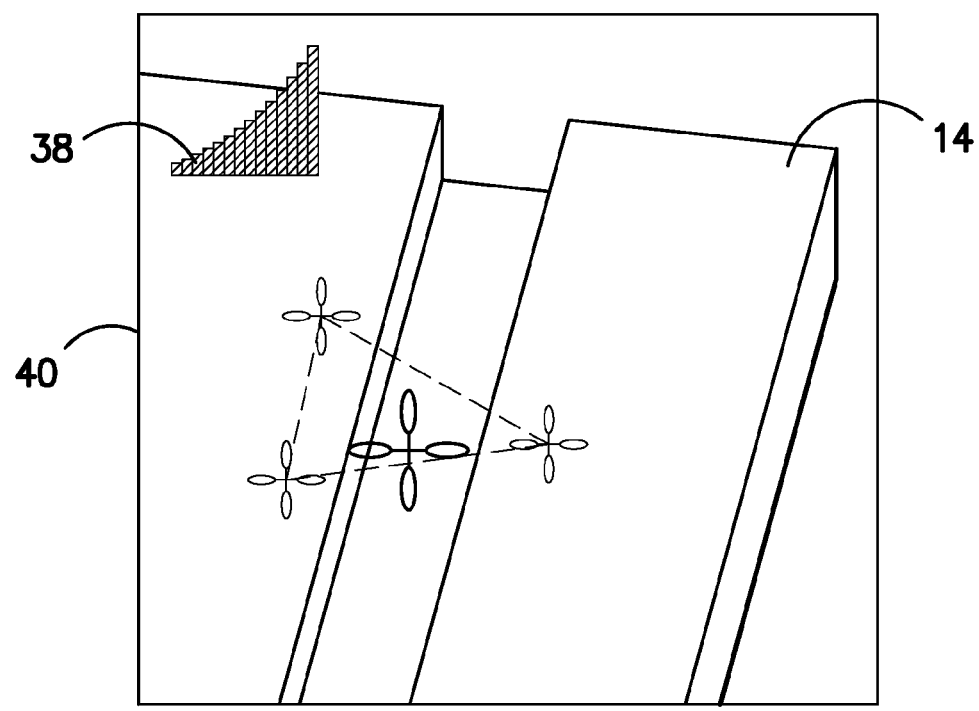
*FIG. -5-*
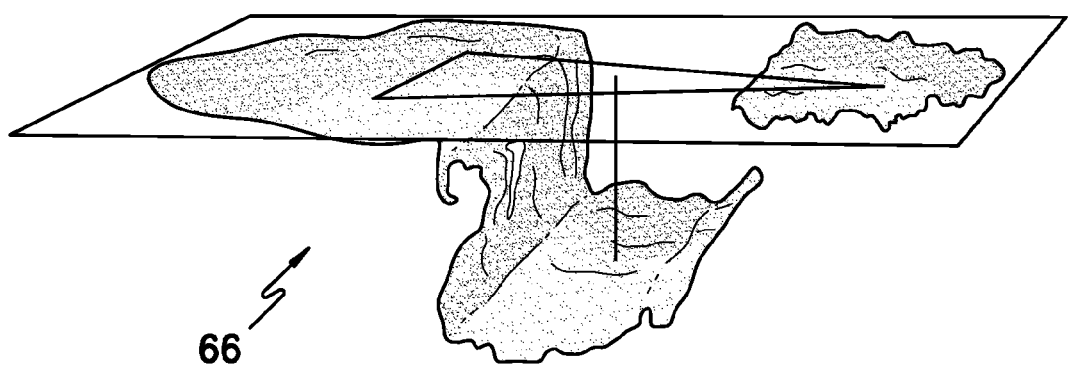
*FIG. -6-*

SYSTEM AND METHOD FOR MEASURING A DISTANCE TO AN OBJECT

FIELD OF THE INVENTION

The present invention generally involves a system and method for measuring a distance to an object. In particular, various embodiments of the present invention provide a signal reflective of a predicted accuracy of a distance measurement that may be obtained from one or more images of the object.

BACKGROUND OF THE INVENTION

Various systems and methods are known in the art for measuring a distance to an object. For example, distances may be calculated using lasers, sound, or other energy pulses reflected off a surface of the object. However, these systems may be prohibitively expensive and/or too large to fit in confined spaces. As a result, various techniques commonly referred to as triangulation measurement, stereo measurement, and/or three-dimensional photography have been developed to calculate one or more distances to the object based on multiple images of the object taken under varying light conditions. For example, analysis of the length, angle, and/or width of various shadows in the images may be used to calculate distances to the object. A collection of calculated distances to the object may then be used to determine a shape, geometry, or profile of the object.

Existing measurement technology often allows an accuracy of the various distances to be determined or calculated. However, the accuracy of the various calculated distances is generally based on the captured images and/or the calculations based on the captured images. As a result, the accuracy of the various calculated distances is generally only available after the time and expense associated with capturing images of the object has already been incurred. In the event the accuracy of the various distances is less than desired, the time and expense associated with capturing images of the object must be repeated. Therefore, a system and method for measuring a distance to an object that provides an indication of the accuracy of the subsequent distance calculations would be useful.

BRIEF DESCRIPTION OF THE INVENTION

Aspects and advantages of the invention are set forth below in the following description, or may be obvious from the description, or may be learned through practice of the invention.

One embodiment of the present invention is a system for measuring a distance to an object. The system includes a camera positioned at a location and at least one signal generated by the camera at the location, wherein the at least one signal is reflective of a setting of the camera. A controller is operably connected to the camera and receives the at least one signal and generates an accuracy signal based on the at least one signal. The accuracy signal is reflective of a predicted accuracy of a distance measurement that may be obtained from one or more images of the object captured by the camera at the location. An indicator operably connected to the controller provides an indication reflective of the accuracy signal.

Another embodiment of the present invention is a method for measuring a distance to an object. The method includes positioning a camera at a location with respect to the object and generating a signal reflective of a predicted accuracy of a distance measurement that may be obtained from one or more images of the object captured by the camera at the location. The method further includes providing an indication reflective of the signal, capturing one or more images of the object at the location, and calculating a distance to the object based on the one or more captured images of the object at the location.

A still further embodiment of the present invention is a method for measuring a distance to an object that includes positioning a camera at a location with respect to the object and determining at least one of an exposure setting or a gain setting for the camera at the location. The method further includes generating a signal based on at least one of the exposure setting or the gain setting for the camera at the location, wherein the signal is reflective of a predicted accuracy of a distance measurement that may be obtained from one or more images of the object captured by the camera at the location. In addition, the method includes providing an indication reflective of the signal, capturing one or more images of the object at the location, and calculating a distance to the object based on the one or more captured images of the object at the location.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a functional block diagram of a system for measuring a distance to an object according to one embodiment of the present invention;

FIG. 2 is an algorithm of a method for measuring a distance to an object according to one embodiment of the present invention;

FIG. 3 is an exemplary visual indication in a viewfinder;

FIG. 4 is an exemplary three-dimensional image of the object produced by the system based on the conditions depicted in FIG. 3;

FIG. 5 is an exemplary visual indication in a viewfinder; and

FIG. 6 is an exemplary three-dimensional image of the object produced by the system based on the conditions depicted in FIG. 5.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system and method for measuring a distance to an object, and the distance to the object may then be used to determine a shape, geometry, or profile of the object. The system and method provide an indication reflective of an accuracy of a distance measurement that may be obtained from one or more images of the object captured by the camera at a particular location. Based on the indication, the camera may be repositioned, if desired, prior to capturing the one or more images to achieve a desired accuracy of the distance measurement.

FIG. 1 provides a functional block diagram of a system 10 for measuring a distance 12 to an object 14 according to one embodiment of the present invention. The system 10 generally includes a camera 16 operably connected to a controller 18. As used herein, the term "camera" encompasses any device capable of capturing one or more images of an object, such as a digital or analog camera known in the art. As shown in FIG. 1, for example, the camera 16 may comprise an aperture 20, a retractable shutter 22 that alternately covers or exposes the aperture 20, a lens 24 for collecting light, and a light 26 for illuminating the object 14. To capture an image, the shutter 22 exposes the aperture 20, and the lens 24 focuses light through the aperture 20 onto a recording media 28.

The camera 16 may be incorporated into a borescope or other device (not shown) known in the art for positioning the camera 16 at a location with respect to the object 14. Once positioned at the location, the camera 16 generates a plurality of signals to the controller 18 that communicate or reflect various settings in the camera 16, and the combination of one or more of the signals may be used to determine a relative distance to the object. For example, the camera 16 may generate a light signal 30 reflective of a light setting (e.g., on, off, or brightness), an exposure signal 32 reflective of an exposure setting (e.g., aperture 20 width, shutter 22 speed), and/or a gain signal 34 reflective of a gain setting associated with the camera 16. Each setting may be manually established by an operator or automatically established by conventional operating protocol or programming included in the camera 16. For example, assuming that the illumination generated by the light 26 is not collimated, the reflected intensity of the illumination decreases in proportion to the square of the distance to the object. As a result, for a given light intensity, the exposure setting and/or gain setting must be increased to maintain a given image brightness level as the distance to the object increases. Thus, for a given light signal 30, the exposure signal 32 and gain signal 34 may be used to predictably indicate the relative distance to the object. It should be understood by one of ordinary skill in the art that particular embodiments the camera 16 may have additional settings and generate additional signals, and the preceding examples are not meant to be an exhaustive list of all settings associated with the camera 16 and/or signals generated by the camera 16.

As described herein, the technical effect of the controller 18 is to generate an accuracy signal 36 based on one or more of the signals 30, 32, 34 generated by the camera 16. The controller 18 may comprise a stand alone component or a sub-component included in any computer system known in the art, such as a laptop, a personal computer, a mini computer, or a mainframe computer. The various controller 18 and computer systems discussed herein are not limited to any particular hardware architecture or configuration. Embodiments of the systems and methods set forth herein may be implemented by one or more general purpose or customized controllers adapted in any suitable manner to provide the desired functionality. For example, the controller 18 may be adapted to provide additional functionality, either complementary or unrelated to the present subject matter. When software is used, any suitable programming, scripting, or other type of language or combinations of languages may be used to implement the teachings contained herein. However, some systems and methods set forth and disclosed herein may also be implemented by hard-wired logic or other circuitry, including, but not limited to, application-specific circuits. Of course, various combinations of computer-executed software and hard-wired logic or other circuitry may be suitable as well.

The controller 18 receives one or more of the signals 30, 32, 34 and compares the signals, individually or collectively, to one or more predetermined limits. For example, the accuracy of most triangulation-based measurement systems decreases non-linearly as the distance to the object increases, and the predetermined limits may comprise various combinations of the light signal 30, exposure signal 32, and/or gain signal 34 mapped to a predicted accuracy of the distance measurement. The controller 18 may thus determine a predicted accuracy of the distance measurement that may be obtained from one or more images of the object 14 captured by the camera 16 at the location based on this comparison of one or more of the signals 30, 32, 34, individually or collectively, to one or more predetermined limits. For example, a high light signal 30, a low exposure signal 32, and a low gain signal 34, individually or in some collective combination, may indicate very good conditions for capturing images of the object 14, resulting in a higher predicted accuracy. Conversely, a low light signal 30, a high exposure signal 32, and a high gain signal 34, individually or in some collective combination, may indicate less favorable conditions for capturing images of the object 14, resulting in a lower predicted accuracy. One of ordinary skill in the art can readily appreciate that the actual signals compared and relative weight applied to each signal may be determined without undue experimentation or research based on various application-specific parameters, such as the particular camera 16, surface characteristics of the object 14, anticipated distances, and predetermined limits.

As shown in FIG. 1, the controller 18 generates the accuracy signal 36 based on one or more of the signals 30, 32, 34, with the accuracy signal 36 reflective of the predicted accuracy of a distance measurement that may be obtained from one or more images of the object 14 captured by the camera 16 at the location. An indicator operably connected to the controller 18 receives the accuracy signal 36 and provides an indication reflective of the accuracy signal 36. The indication may comprise, for example, a visual display 38, such as a digital or analog icon, included in a viewfinder 40 that conveys the accuracy signal 36 to the operator. Alternately, or in addition, the indication may comprise a speaker that produces an audio indication or sound 42 that similarly conveys the accuracy signal 36 to the operator.

FIG. 2 provides a flow diagram or algorithm of a method for measuring a distance to the object 14 according to one embodiment of the present invention, and FIGS. 3-6 provide various visual displays 38 and three-dimensional images of the object 14 to illustrate the method. At block 50, the operator positions the camera 16 at a location relative to the object 14. At block 52, various settings are automatically or manually established in the camera 16 to enhance video capture of the object 14 at the location. For example, conventional operating protocol or programming included in the camera 16 may be used to automatically establish various settings such as the brightness of the light 26, speed of the shutter 22, focus, gain, and a myriad of other optical settings available in the camera 16. Alternately, or in addition, the operator may manually establish or override any of the settings, if desired. At block 54, the camera 16 determines the settings and generates one or more signals reflective of the settings to the controller 18. For example, the camera 16 may generate the light signal 30, exposure signal 32, and/or gain signal 34 to the controller 18, as previously described.

At diamond 56, the controller 18 compares the one or more signals 30, 32, 34 to one or more predetermined limits and generates the signal 36 reflective of a predicted accuracy of a distance measurement that may be obtained from one or more images of the object 14 captured by the camera 16 at the location. At block 58, the signal 36 generates the indication (e.g., visual or aural) reflective of the signal 36, and thus the predicted accuracy. For example, as shown in FIG. 3, the visual display 38 in the viewfinder 40 reflects a relatively low predicted accuracy for any distance measurement obtained from one or more images of the object 14 captured by the camera 16 at the location. As a result, the operator may start the method over at block 50 by repositioning the camera 16 to a new position, as indicated by line 60 in FIG. 2. In contrast, the visual display 38 in the viewfinder 40 shown in FIG. 5 reflects a relatively high predicted accuracy for any distance measurement obtained from one or more images of the object 14 captured by the camera 16 at the location. As a result, the operator may proceed with further image capture and calculation of distances to the object 14.

At block 62, the system 10 captures one or more images of the object 14, and at block 64, the system 10 uses the captured image(s) to determine or calculate one or more distances to the object 14. For example, the system 10 may use one or more techniques variously referred to as triangulation measurement, stereo measurement, and/or three-dimensional photography, although the particular measurement technique is not a limitation of the present invention unless specifically recited in the claims. FIG. 4 provides an exemplary three-dimensional image 66 of the object 14 produced by the system 10 based on the conditions depicted in FIG. 3. As shown in FIG. 4, the calculated distances to the object 14 are relatively inaccurate, producing the correspondingly inaccurate three-dimensional image 66 which includes substantial amounts of noise and other indicia of inaccurate measurements or profiling of the surface of the object 14. In contrast, FIG. 6 provides an exemplary three-dimensional image 66 of the object 14 produced by the system 10 based on the conditions depicted in FIG. 5. As shown in FIG. 6, the calculated distances to the object 14 are relatively accurate, producing the correspondingly accurate three-dimensional image 66 which more closely approximates the profile of the object 14. As a result, the various systems and methods of the present invention provide the operator with an indication of the predicted accuracy of the distance measurements before the operator proceeds with the time-consuming and potentially expensive process of image capturing and distance calculations, thus allowing the operator to reposition or adjust the camera 16 to achieve a desired accuracy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
    a camera, wherein the camera is configured to be positioned at a location, and the camera is configured to generate at least one signal when at the location based at least in part on a combination of an exposure setting of the camera and a gain setting of the camera;
    a controller operably connected to the camera, wherein the controller is configured to receive the at least one signal and the controller is configured to generate an accuracy signal based on the at least one signal prior to capturing one or more images of an object by the camera, wherein the accuracy signal is reflective of a predicted accuracy of a distance measurement between a first point of the object and a second point of the object, and the distance measurement is obtained from the one or more images of the object captured by the camera at the location; and
    an indicator operably connected to the controller, wherein the indicator is configured to provide an indication reflective of the accuracy signal.

2. The system as in claim 1, comprising a predetermined limit, wherein the controller compares the at least one signal to the predetermined limit.

3. The system as in claim 1, wherein the indication comprises a visual display, a sound, or any combination thereof.

4. The system as in claim 1, comprising a light operably connected to the camera.

5. The system as in claim 1, wherein the camera comprises a borescope.

6. A method, comprising:
    generating a signal based upon an exposure setting and a gain setting for a camera, the signal reflective of a predicted accuracy of a distance measurement between a first point of an object and a second point of the object, and the signal reflective of the predicted accuracy is generated prior to capturing one or more images of the object by the camera positioned at a location with respect to the object;
    providing an indication reflective of the predicted accuracy based at least in part on the signal;
    capturing the one or more images of the object at the location after generating the signal and providing the indication; and
    calculating a distance to the object based on the one or more captured images of the object at the location after generating the signal.

7. The method as in claim 6, wherein the indication comprises a visual indication.

8. The method as in claim 6, wherein the indication comprises an audio indication.

9. The method as in claim 6, further comprising determining, before capturing the one or more images of the object, one or more predetermined limits for at least one of an exposure setting or a gain setting for the camera at the location.

10. The method as in claim 9, further comprising comparing, before capturing the one or more images of the object, at least one of the exposure setting or the gain setting for the camera at the location to the one or more predetermined limits, wherein the signal reflective of the predicted accuracy is based at least in part on the comparison of at least one of the exposure setting or the gain setting to the one or more predetermined limits.

11. The method as in claim 6, further comprising generating the signal reflective of the predicted accuracy based on at least one of an exposure setting or a gain setting for the camera at the location.

12. The method as in claim 6, further comprising generating a three-dimensional image of the object, and calculating the distance measurement from the three-dimensional image of the object.

13. The method as in claim 6, further comprising illuminating the object.

14. A method, comprising:
   determining an exposure setting and a gain setting for a camera, wherein the camera is positioned at a location with respect to an object;
   generating a signal based on the exposure setting and the gain setting and the camera at the location, wherein the signal is reflective of a predicted accuracy of a distance measurement between a first point of the object and a second point of the object, and the signal reflective of the predicted accuracy is generated prior to capturing one or more images of the object by the camera at the location;
   providing an indication reflective of the predicted accuracy based at least in part on the signal;
   capturing the one or more images of the object at the location after generating the signal and providing the indication; and
   calculating a distance to the object based on the one or more images of the object at the location after generating the signal.

15. The method as in claim 14, further comprising comparing at least one of the exposure setting or the gain setting to a predetermined limit.

16. The method as in claim 14, further comprising displaying a visual indication reflective of the signal.

17. The method as in claim 14, further comprising generating an audio indication reflective of the signal.

18. The method as in claim 14, further comprising generating a three-dimensional image of the object, and calculating the distance measurement from the three-dimensional image of the object.

\* \* \* \* \*